US009488768B2

(12) United States Patent
Banerjee

(10) Patent No.: US 9,488,768 B2
(45) Date of Patent: Nov. 8, 2016

(54) OPTICAL FILM, SURFACE LIGHT SOURCE DEVICE, AND LIQUID CRYSTAL DISPLAY DEVICE

(71) Applicant: Sumitomo Chemical Company, Limited, Tokyo (JP)

(72) Inventor: Saswatee Banerjee, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 253 days.

(21) Appl. No.: 14/357,419

(22) PCT Filed: Nov. 12, 2012

(86) PCT No.: PCT/JP2012/079255
§ 371 (c)(1),
(2) Date: May 9, 2014

(87) PCT Pub. No.: WO2013/069797
PCT Pub. Date: May 16, 2013

(65) Prior Publication Data
US 2014/0307205 A1    Oct. 16, 2014

(30) Foreign Application Priority Data

Nov. 11, 2011  (JP) .................. 2011-247136

(51) Int. Cl.
| | |
|---|---|
| G02F 1/1335 | (2006.01) |
| F21V 8/00 | (2006.01) |
| G02B 5/30 | (2006.01) |
| F21V 7/22 | (2006.01) |
| B32B 27/08 | (2006.01) |
| B32B 27/36 | (2006.01) |
| B32B 7/02 | (2006.01) |

(52) U.S. Cl.
CPC ............ *G02B 6/0033* (2013.01); *B32B 27/08* (2013.01); *B32B 27/36* (2013.01); *F21V 7/22* (2013.01);

(Continued)

(58) Field of Classification Search
None
See application file for complete search history.

(56) References Cited

U.S. PATENT DOCUMENTS 5,962,114 A * 10/1999 Jonza .................... B29C 55/023
                                                     359/489.11
2005/0018285 A1    1/2005 Kubota et al.
(Continued)

FOREIGN PATENT DOCUMENTS

| JP | 2002-507013 A | 3/2002 |
|---|---|---|
| JP | 2002-172735 A | 6/2002 |

(Continued)

OTHER PUBLICATIONS

Int'l Search Report issued Dec. 4, 2012 in Int'l Application No. PCT/JP2012/079255.

(Continued)

*Primary Examiner* — Lucy Chien
(74) *Attorney, Agent, or Firm* — Panitch Schwarze Belisario & Nadel LLP

(57) ABSTRACT

An optical film according to one embodiment includes at least one stack having a plurality of basic pairs, each pair being composed of a first layer and a second layer having different refractive indices and being laminated. The number of the stacks, a difference in the refractive index between the first and second layers, and the number of the basic pairs are set such that a reflectance spectrum of the at least one stack as a whole matches a target reflectance spectrum. The target reflectance spectrum includes first and second reflectance spectrum components corresponding to first and second polarized light beams in a predetermined wavelength range, wherein each of them is a spectrum having at least one reflective peak region including a spectrum region having a reflectance of 50% or more and a wavelength width of 20 to 60 nm.

10 Claims, 8 Drawing Sheets

(52) U.S. Cl.
CPC .......... *G02B 5/3041* (2013.01); *G02B 5/3083* (2013.01); *G02F 1/1336* (2013.01); *B32B 7/02* (2013.01); *B32B 2250/24* (2013.01); *B32B 2307/40* (2013.01); *B32B 2457/202* (2013.01); *B32B 2551/00* (2013.01); *G02F 2001/133624* (2013.01); *G02F 2203/02* (2013.01)

(56) References Cited

U.S. PATENT DOCUMENTS

| | | |
|---|---|---|
| 2006/0007548 A1 | 1/2006 | Watanabe |
| 2007/0097509 A1 | 5/2007 | Nevitt et al. |
| 2008/0284316 A1 | 11/2008 | Kurihara et al. |

FOREIGN PATENT DOCUMENTS

| | | |
|---|---|---|
| JP | 2003337381 A | 11/2003 |
| JP | 2006-023471 A | 1/2006 |
| JP | 2009514037 A | 4/2009 |
| JP | 2009-104941 A | 5/2009 |
| JP | 2010048888 A | 3/2010 |

OTHER PUBLICATIONS

Int'l Preliminary Report on Patentability issued May 22, 2014 in Int'l Application No. PCT/JP2012/079255.

Office Action issued Jun. 15, 2016 in JP Application No. 2012-248614.

\* cited by examiner

OPTICAL FILM, SURFACE LIGHT SOURCE DEVICE, AND LIQUID CRYSTAL DISPLAY DEVICE

CROSS-REFERENCE TO RELATED APPLICATION

This application is a Section 371 of International Application No. PCT/JP2012/079255, filed Nov. 12, 2012, which was published in the Japanese language on May 16, 2013, under International Publication No. WO 2013/069797 A1, and the disclosure of which is incorporated herein by reference.

TECHNICAL FIELD

The present invention relates to an optical film, a surface light source device, and a liquid crystal display device.

BACKGROUND ART

In liquid crystal display devices, a reflective film, one of optical films, is disposed for a light-guiding plate on the side thereof opposite to (on the rear surface side of) a liquid crystal cell. The reflective film plays a role in reflecting light emitted from the light-guiding plate to the rear surface side to return the light to the viewer side (recycling the light). Color filters are used in emission of light beams of colors. The color filter absorbs the light beams out of a predetermined wavelength region, thereby exhibiting a function to emit the light beam of a color to be emitted from pixels from the pixels.

A further improvement in luminance and an increase in saturation, which means that the width of distribution of wavelengths of the light beams emitted from the pixels of the respective colors is narrowed to emit intense light beams of purer colors, are required for the liquid crystal display devices.

The conventional reflective film is produced by coating a metal plate with a light-diffusing coating, as described in Patent Literature 1. The reflectance of the reflective film varies between approximately 90% and 93% at a wavelength of 550 nm depending on the material of the light-diffusing coating. The conventional reflective films reflect all visible light beams almost equally, and look white to human eyes. In such a reflective film, the reflectance is essentially in a broad band (the reflecting light beams are distributed across a wide wavelength range). For this reason, the reflective film is not used for the increase in saturation.

Patent Literature 2 proposes a wavelength-selective reflective filter including a fluorescent layer that recycles light beams having a wavelength that do not transmit through a color filter and are absorbed to be lost. However, the fluorescent layer only converts the light at a short wavelength into the light at a longer wavelength; if the wavelength range of a light source is wide, there has been a problem that red light or green light is produced more than needed. For this reason, the wavelength-selective reflective filter including the fluorescent layer loses the color balance of a typical display device.

CITATION LIST

Patent Literature

Patent Literature 1: Japanese Patent Application Laid-Open Publication No. 2002-172735
Patent Literature 2: Japanese Patent Application Laid-Open Publication No. 2009-104941

SUMMARY OF INVENTION

Technical Problem

Then, an object of the present invention is to provide an optical film enabling a liquid crystal display device with high saturation and having a function to increase saturation when reflecting light, and a surface light source device and a liquid crystal display device including the optical film.

Solution to Problem

The optical film according to one aspect of the present invention includes at least one stack having a plurality of basic pairs, each pair being composed of a first layer and a second layer having different refractive indices from each other and being laminated. The number of the stacks, the difference in the refractive index between the first and second layers in the at least one stack, and the number of the basic pairs are set such that a reflectance spectrum of the at least one stack as a whole matches a target reflectance spectrum. The target reflectance spectrum includes first and second reflectance spectrum components corresponding to first polarized light polarized in a specific direction in a wavelength range from 400 to 700 nm and second polarized light polarized in a direction orthogonal to the polarizing direction of the first polarized light, respectively. Each of the first and second reflectance spectrum components is a spectrum having at least one reflective peak region which includes a spectrum region having a reflectance of 50% or more and a wavelength width of 20 to 60 nm.

The optical film includes the at least one stack wherein the number of the stacks, the difference between the refractive indices of the first layer and the second layer in the stack, and the number of the basic pairs are determined so as to have a reflectance spectrum matching the target reflectance spectrum above. For this reason, when light enters the optical film, the optical film can selectively reflect a light beam having a predetermined wavelength without polarization and separation of the light.

In one embodiment, $\Delta nL$ and $\Delta nH$ may have a relation defined by an expression (1) where a difference in the refractive index within the first layer is defined as $\Delta nL$ and a difference in the refractive index within the second layer is defined as $\Delta nH$.

[Expression 1]

$$\Delta nL \leq 0.02 \text{ and } \Delta nH \leq 0.02 \quad (1)$$

In the expression (1), $\Delta nL = nL_{max} - nL_{min}$; $\Delta nH = nH_{max} - nH_{min}$; $nL_{max}$ and $nH_m$ are maximum refractive indices of the first and second layers, respectively, of refractive indices in the thickness direction of the first and second layers and two directions orthogonal to each other and orthogonal to the thickness direction; and $nL_{min}$ and $nH_{min}$ are minimum refractive indices of the first and second layers, respectively, of refractive indices in the thickness direction of the first and second layers and the two directions orthogonal to each other and orthogonal to the thickness direction.

In one embodiment, Δn may satisfy an expression (2) where the refractive index of the first layer is defined as nL, the refractive index of the second layer is defined as nH, and the difference in the refractive index is defined as Δn.
[Expression 2]

$$0.05 \leq \Delta n \leq 0.25 \quad (2)$$

In the expression (2),
Δn=|nL−nH|;
nL=(nL$_{max}$+nL$_{min}$)/2;
nH=(nH$_{max}$+nH$_{min}$)/2;
nL$_{max}$ and nH$_{max}$ are the maximum refractive indices of the first and second layers, respectively, of refractive indices in the thickness direction of the first and second layers and two directions orthogonal to each other and orthogonal to the thickness direction; and nL$_{min}$ and nH$_{min}$ are minimum refractive indices of the first and second layers, respectively, of refractive indices in the thickness direction of the first and second layers and the two directions orthogonal to each other and orthogonal to the thickness direction.

In one embodiment, the number of the basic pairs can be 25 to 50.

In one embodiment, the thickness of the first layer and that of the second layer each may be 5 to 400 nm.

In one embodiment, the number of the stacks may be the number of reflective peak regions or more.

In one embodiment, the number of the stacks can be 1 to 3.

In one embodiment, a reflectance spectrum component of the first polarized light and that of the second polarized light in the target reflectance spectrum may each have one reflective peak region in the range of 430 to 480 nm, one reflective peak region in the range of 510 to 560 nm, and one reflective peak region in the range of 600 to 660 nm.

In this case, the light beams at wavelengths corresponding to blue, green, and red can be selectively reflected.

Another aspect of the present invention relates to a surface light source device. The surface light source device includes a light source unit, a surface light-emitting element that converts light from the light source unit into planar light to emit the planar light from a light-emitting surface portion, and the optical film according to one aspect of the present invention disposed for the surface light-emitting element on the side thereof opposite to the light-emitting surface portion.

Further another aspect of the present invention relates to a liquid crystal display device. The liquid crystal display device includes a light source unit, a surface light-emitting element that converts light from the light source unit into planar light to emit the planar light from a light-emitting surface portion, the optical film according to one aspect of the present invention disposed for the surface light-emitting element on the side thereof opposite to the light-emitting surface portion, and a liquid crystal panel disposed on the light-emitting surface portion of the surface light-emitting element, the planar light entering the liquid crystal panel.

Advantageous Effects of Invention

According to the present invention, an optical film enabling a liquid crystal display device having high saturation and having a function to increase saturation when reflecting light, and a surface light source device and a liquid crystal display device including the optical film can be provided.

DESCRIPTION OF EMBODIMENTS

Figure 1:
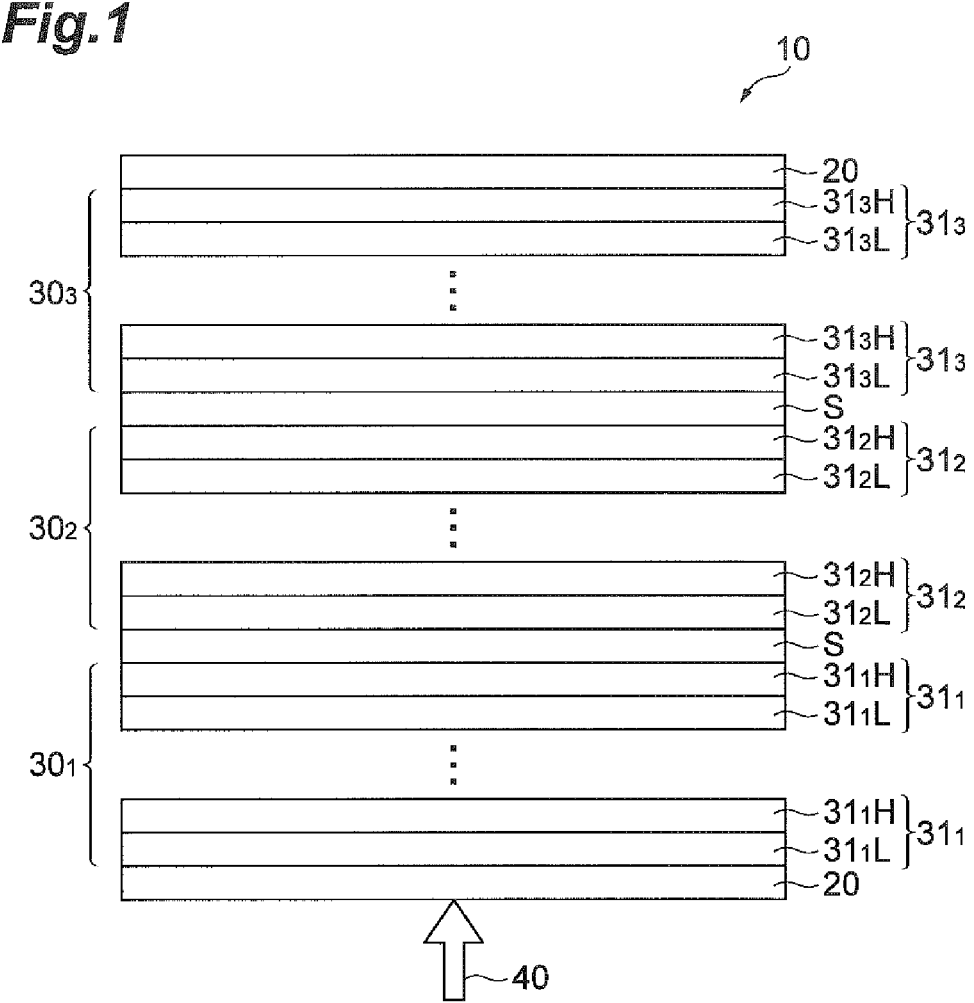
FIG. 1 is a schematic view for illustrating a schematic configuration of an optical film according to one embodiment.

Hereinafter, Embodiments of the present invention will be described with reference to the drawings. In the description of the drawings, same reference numerals will be given to same components, and duplication of the description will be omitted. In the drawings, dimensional ratios do not always match those described. In the description, the terms representing directions such as "up" and "down" are terms based on states shown in the drawings and used for convenience.

The optical film according to one embodiment (wavelength-selective reflective film) has a function to increase saturation when reflecting light. The present inventor found that the liquid crystal display device using the reflective film can lead to a liquid crystal display device in which pixels can emit the light with high saturation, by giving to the reflective film a function to selectively reflect the light at a specific wavelength and increase saturation. Moreover, the present inventor found that the reflective film can be produced by laminating a polymer film, and can be easily produced because the number of polymer films to be laminated is smaller.

The liquid crystal display device (LCD) usually uses a color filter to display a color image. The color filter transmits only the light beam having a specific wavelength corresponding to blue, green, or red, and absorbs the light beams having other wavelengths. A pigment or a dye is used for the color filter, and saturation is not sufficient when the color filter transmits the light. The saturation of the liquid crystal display device depends on the transmission spectrum around the wavelength of the maximum transmittance of the color filter. The conventional reflective film with a broad band does not contribute to improvement in the saturation of the liquid crystal display device. However, if the optical film having wavelength selectivity described below is used as the reflective film, the saturation can be increased. In one embodiment, structural parameters are also described to match the spectrum of the reflectance of the reflective film with a desired target spectrum. For this reason, if the optical film according to one embodiment is used instead of the conventional reflective film, a target reflectance spectrum is attained; when viewed from the display surface side of the liquid crystal display device, the saturation of the entire liquid crystal display device is improved more significantly than that of the conventional liquid crystal display device. The optical film according to one embodiment has a laminate (stack) made of thin films, and can attain a reflectance close to 100% unlike the conventional reflective film.

The optical film according to one embodiment is a film that increases saturation when reflecting light. If the wavelength ranges of visible light specified in advance are selected usually corresponding to three colors of red, green, and blue or yellow, cyan, and magenta, the optical film according to one embodiment can be used for the liquid crystal display device for color display.

The present inventor extensively studied to achieve the optical film having a function to increase saturation, and conceived the optical film described later. In LCD, one method for increasing saturation is a method in which a film reflecting the light in a broad wavelength region is replaced with a reflective film reflecting the light in a specific narrow wavelength region at a specific wavelength. Superfluous light beams at wavelengths reducing the performance of displaying an object sharply, which is needed for the liquid crystal display device, are mixed with the light emitted from the light source, and need to be removed. It cannot be said that the wavelength of the light emitted from the color filter has a sufficiently narrow distribution; if the wavelength of the light has a narrower distribution, the saturation of the liquid crystal display device can be improved. The reflective film having this saturation improving function and designed to reflect the light having a specific narrow wavelength region at a target specific wavelength is the optical film according to one embodiment. The optical film according to one embodiment can be used for the liquid crystal display device by restricting the reflection to the selected specific wavelength region. Then, a liquid crystal display device having high luminance is attained because the light traveling toward the rear surface direction can be recycled. In the case where the wavelength-selective reflective film as the optical film according to one embodiment is implemented using a multi-layered optical material, the thicknesses of the layers in the stack do not need to be systematically varied, and use of a special material is unnecessary. The number of the layers can be a minimum.

One method for ensuring the desired optical performance of the optical film according to one embodiment is to establish criteria for wavelength selectivity. The wavelength selectivity is determined by the difference ($\Delta R$) in the reflectance between the maximum value (maximum reflectance) and the minimum value (minimum reflectance). The value of $\Delta R$ determines the reflection proportion of the light in the desired wavelength range. $\Delta R$ is selected so as to match wavelength selectivity because a plurality of maximum values and minimum values is sometimes present. Logically the maximum value of $\Delta R$ is 100% and the minimum value thereof is 0%, and ideally $\Delta R$ should be 100%. Actually, for the wavelength-selective reflective film to have the performance for use, $\Delta R$ is 50% or more. An object of design is to ensure $\Delta R$ of 50% or more. A preferable value of $\Delta R$ is 60% or more, and more preferably 70% or more.

Hereinafter, the optical film according to one embodiment and the liquid crystal display device including the optical film will be specifically described.

FIG. 1 is a schematic view for illustrating a schematic configuration of the optical film according to one embodiment. An optical film 10 is designed to have a reflectance spectrum matching the target reflectance spectrum. The target reflectance spectrum is a spectrum including first and second reflectance spectrum components corresponding to first polarized light polarized in a specific direction in a predetermined wavelength range and second polarized light polarized in a direction orthogonal to the polarization direction of the first polarized light, respectively, wherein the first and second reflectance spectrum components each have at least one reflective peak region including a spectrum region having a reflectance of 50% or more and a wavelength width of 20 to 60 nm. Namely, the optical film 10 is a wavelength-selective reflective film having substantially no polarization and separation function and selectively reflecting the light at a specific wavelength. The optical film 10 can be used for the liquid crystal display device, for example.

As an example, using an embodiment in which the predetermined wavelength ranges are a blue wavelength range (namely, 430 nm≤λ≤480 nm), a green wavelength range (namely, 510 nm≤λ≤560 nm), and a red wavelength range (namely, 600 nm≤λ≤660 nm), the configuration of the optical film 10 will be described.

The optical film 10 has three stacks $30_1$, $30_2$, and $30_3$. The stacks $30_1$, $30_2$, and $30_3$ are laminated. Spacer layers S, S may be disposed between the stack $30_1$ and the stack $30_2$ and between the stack $30_2$ and the stack $30_3$.

The stacks $30_1$, $30_2$, and $30_3$ may be interposed between a pair of skin layers 20. In the configuration in which the stacks $30_1$, $30_2$, and $30_3$ are interposed between the pair of skin layers 20, one of the pair of the skin layers 20 can be considered as a substrate in the lamination structure of the stacks $30_1$, $30_2$, and $30_3$. Namely, the optical film 10 including the pair of the skin layers 20 can be considered to have a structure in which the stacks $30_1$, $30_2$, and $30_3$ are laminated on the skin layer 20 as a substrate and another skin layer 20 is disposed on the side opposite to the skin layer 20 as the substrate.

The spacer layer S and the skin layer 20 are used for protection of the optical material layer that forms the optical film 10 and/or for an increase in the strength of the optical film 10, for example. The thickness of the spacer layer S and that of the skin layer 20 are selected so as to barely affect optical properties (wavelength selectivity) of the optical film 10 at a focused wavelength range from 400 to 700 nm. Examples of materials for the spacer layer S and the skin layer 20 include polyethylene terephthalate (PET). The material for the spacer layer S and that for the skin layer 20 may be different. Similarly, materials for the pair of the skin layers 20 may also be different. For the refractive index of the skin layer 20, a high refractive index is selected.

In the description below, the lamination direction of the stacks $30_1$, $30_2$, and $30_3$ is referred to a z-direction. The directions orthogonal to the z-direction of the stacks $30_1$, $30_2$, and $30_3$ are referred to as an x-direction and a y-direction, respectively. The x-direction is orthogonal to the y-direction. The x-direction and the y-direction are directions in a plane orthogonal to the z-direction. Hereinafter, the first polarized light is defined as an s-polarized component in incident light 40 to the optical film 10, unless otherwise specified. Furthermore, the x-direction shown in FIG. 1 is defined as the polarization direction of the s-polarized component (vibration direction of an electric field). In this case, the y-direction is the polarization direction of the p-polarized component of the incident light 40 (vibration direction of an electric field).

Figure 2:
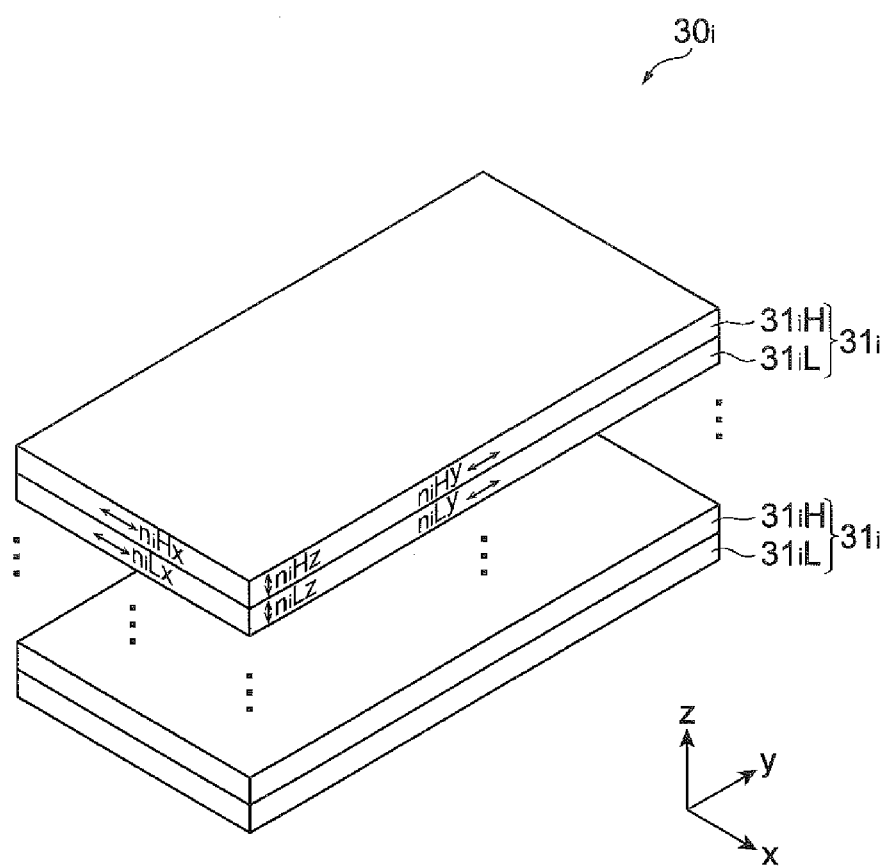
FIG. 2 is a perspective view schematically showing a configuration of a stack that the optical film shown in FIG. 1 has.

With reference to FIGS. 1 and 2, the basic structure of the stacks $30_1$ to $30_3$ will be described in which the stacks $30_1$ to $30_3$ are referred to as a stack $30_i$. i is one of 1, 2, and 3. FIG. 2 is a perspective view schematically showing the configuration of the stack $30_i$.

The stack $30_i$ has a plurality of basic blocks (basic pairs) $31_i$, each of the basic blocks being composed of a first optical material layer $31_iL$ and a second optical material layer $31_iH$ laminated in the z-direction. As one example, the number of the basic blocks (basic pairs) $31_i$ is 25 or more and 100 or less, and preferably 25 or more and 50 or less. The stack $30_i$ is a laminate prepared by laminating a plurality of basic blocks $31_i$ in the z-direction. Accordingly, in the stack $30_i$, the first optical material layer $31_iL$ and the second optical material layer $31_iH$ are alternately laminated. Where the total of the number of the first optical material layers $31_iL$ and the number of the second optical material layers $31_iH$ in the stack $30_i$ is 2M (M is an integer of 1 or more), 2M is 50 or more and 200 or less, and preferably 50 or more and 100 or less as one example. The number of the basic blocks $31_1$ to $31_3$ or the total number of the layers in the stacks $30_1$ to $30_3$ may be different for the stacks $30_1$ to $30_3$. The number of the layers of the entire optical film 10 is preferably 150 or more and 500 or less.

The refractive index $n_iH$ of the second optical material layer $31_iH$ is higher than the refractive index $n_iL$ of the first optical material layer $31_iL$. Namely, the refractive index $n_iL$ of the first optical material layer $31_iL$ is different from the refractive index $n_iH$ of the second optical material layer $31_iH$. The refractive index $n_iL$ and the refractive index $n_iH$ will be described.

The refractive indices of the first optical material layer $31_iL$ in the x-direction, the y-direction, and the z-direction are expressed as $n_iLx$, $n_iLy$, and $n_iLz$, and the refractive indices of the second optical material layer $31_iH$ in the x-direction, the y-direction, and the z-direction are expressed as $n_iHx$, $n_iHy$, and $n_iHz$. Furthermore, of the refractive indices $n_iLx$, $n_iLy$, and $n_iLz$ of the first optical material layer $31_iL$, the maximum refractive index is expressed as $n_iL_{max}$, and the minimum refractive index is expressed as $n_iL_{min}$. Similarly, of the refractive indices $n_iHx$, $n_iHy$, and $n_iHz$ of the second optical material layer $31_iH$, the maximum refractive index is expressed as $n_iH_{max}$, and the minimum refractive index is expressed as $n_iH_{min}$.

The refractive index $n_iL$ of the first optical material layer $31_iL$ and the refractive index $n_iH$ of the second optical material layer $31_iH$ may be defined as follows.

[Expression 3]

$$n_iL=(n_iL_{max}+n_iL_{min})/2 \quad (3a)$$

$$n_iH=(n_iH_{max}+n_iH_{min})/2 \quad (3b)$$

According to these definitions, the refractive indices $n_iL$ and $n_iH$ correspond to the average refractive index of the refractive indices of the first optical material layer $31_iL$ and that of the second optical material layer $31_iH$, respectively.

It is preferable that the refractive indices $n_iLx$, $n_iLy$, and $n_iLz$ of the first optical material layer $31_iL$ be substantially equal, namely, the first optical material layer $31_iL$ be an isotropic optical material layer. Similarly, it is preferable that the refractive indices $n_iHx$, $n_iHy$, and $n_iHz$ of the second optical material layer $31_iH$ be substantially equal, namely, the second optical material layer $31_iH$ be an isotropic optical material layer. However, in the production process of the optical film 10, the anisotropy of the refractive index (change in the refractive index according to the directions) may be exhibited. The anisotropy of the first optical material layer $31_iL$ is expressed as the difference in the refractive index $\Delta n_iL$ between $n_iL_{max}$ and $n_iL_{min}$. Namely, $\Delta n_iL=n_iL_{max}-n_iL_{min}$. Similarly, the anisotropy of the second optical material layer $31_iH$ is expressed as the difference in the refractive index $\Delta n_iH$ between $n_iH_{max}$ and $n_iH_{min}$. Namely, $\Delta n_iH=n_iH_{max}-n_iH_{min}$. The difference in the refractive index $\Delta n_iL$ and the difference in the refractive index $\Delta n_iH$ correspond to the birefringences of the first and second optical material layers $31_iL$ and $31_iH$, respectively. From the viewpoint of the optical film 10 having no polarization and separation function, it is preferable that such anisotropy satisfy expressions (4a) and (4b).

[Expression 4]

$$\Delta n_iL \leq 0.02 \quad (4a)$$

$$\Delta n_iH \leq 0.02 \quad (4b)$$

Here, the case where in the production process of the optical film 10, anisotropy can be produced in the first and second optical material layers $31_iL$ and $31_iH$; if $\Delta n_iL$ and $\Delta n_iH$ are in the ranges in which the expressions (4a) and (4b) are satisfied, the first and second optical material layers $31_iL$ and $31_iH$ each may have unique anisotropy (non-isotropy).

In one embodiment, where the difference between the refractive index nL and the refractive index nH is expressed as $\Delta n_i$, $\Delta n_i$ may satisfy the following expression.

[Expression 5]

$$0.05 \leq \Delta n_i \leq 0.25 \quad (5)$$

In the expression (5), $\Delta n_i = |n_iH - n_iL|$. The materials for the first and second optical material layers $31_iL$ and $31_iH$ are not particularly limited as long as the materials are a transparent material that can satisfy the condition on the difference in the refractive indices described above. One example of the materials for the first and second optical material layers $31_iL$ and $31_iH$ is a substantially transparent thermoplastic resin. The materials for the first and second optical material layers $31_iL$ and $31_iH$ each can be selected from crystalline, semi-crystalline, or amorphous polymer materials, for example. The materials for the first and second optical material layers $31_iL$ and $31_iH$ each preferably has optical isotropy, and can be a material that produces no significant difference in the refractive indices in the x-, y-, and z-directions when the material is processed under necessary process conditions.

Specific examples of the materials for the first and second optical material layers $31_iL$ and $31_iH$ include polyethylene naphthalate (PEN) and isomers thereof (such as 2,6-PEN, 1,4-PEN, 1,5-PEN, 2,7-PEN, and 2,3-PEN) and polyalkylene terephthalate (such as polyethylene terephthalate (PET), polybutylene terephthalate, and poly-1,4-cyclohexanedimethylene terephthalate).

The materials for the first and second optical material layers $31_1L$, and $31_iH$ may be copolymers of PEN, copolymers of polyalkane terephthalate, or styrene copolymers. Examples of the copolymers of PEN include copolymers of 2,6-, 1,4-, 1,5-, 2,7-, and 2,3-naphthalenedicarboxylic acid or esters thereof with a) terephthalic acid or an ester thereof, b) isophthalic acid or an ester thereof, c) phthalic acid or an ester thereof, d) alkane glycol, e) cycloalkane glycol (such as cyclohexanedimethanol diol), or f) alkanedicarboxylic acid (such as cyclohexanedicarboxylic acid). Examples of the copolymers of polyalkane terephthalate include copolymers of terephthalic acid or esters thereof with a) naphthalenedicarboxylic acid or an ester thereof, b) isophthalic acid or an ester thereof, c) phthalic acid or an ester thereof, d) alkane glycol, e) cycloalkane glycol (such as cyclohexanedimethanol diol), f) alkanedicarboxylic acid, and/or g)

cycloalkenedicarboxylic acid (such as cyclohexane dicarboxylic acid). Examples of the styrene copolymers include styrene-butadiene copolymers and styrene-acrylonitrile copolymers.

Furthermore, the first and second optical material layers $31_iL$ and $31_iH$ may be composed of a mixture of two or more exemplified polymers or polymer copolymers. The exemplified materials are also preferable because the absorption coefficient is small and loss by absorption is small.

In the stack $30_i$, a preferable combination of the materials for the first and second optical material layers $31_iL$ and $31_iH$ is PEN/sPS, sPS/PEN, PEN/co-PET, co-PET/PEN, PET/sPS, or sPS/PET. The co-PET means a copolymer or mixture with another monomer composed of naphthalene terephthalic acid or the like as a main raw material. Furthermore, the sPS means syndiotactic polystyrene. Alternatively, another preferable combination of the materials for the first and second optical material layers $31_iL$ and $31_iH$ is a combination of copolycarbonate having a refractive index of 1.64 with a copolymer of a polymethyl methacrylate resin having a refractive index of 1.45.

In the stack $30_1$ to the stack $30_3$, the materials for the first optical material layers $31_1L$ to $31_3L$ may be the same. In the stack $30_1$ to the stack $30_3$, the materials for the second optical material layers $31_1H$ to $31_3H$ may be the same.

The thicknesses $t_iL$ and $t_iH$ of the first and second optical material layers $31_iL$ and $31_iH$ in the z-direction are sufficiently shorter than the lengths of the first and second optical material layers $31_iL$ and $31_iH$ in the x-direction and the y-direction, respectively. Namely, the first and second optical material layers $31_iL$ and $31_iH$ have a form of a thin film. The thicknesses $t_iL$ and $t_iH$ of the first and second optical material layers $31_iL$ and $31_iH$ in the z-direction are shorter than a wavelength $\lambda$ of the incident light 40 to the optical film 10. An example of the thicknesses $t_iL$ and $t_iH$ is 5 nm or more and 400 nm or less, and a more preferable example is 5 nm or more and 200 nm or less.

In the stack $30_i$, the thicknesses $t_iL$ of all the first optical material layers $31_iL$ are the same. In the stack $30_i$, the thicknesses $t_iH$ of all the second optical material layers $31_iH$ are the same. In the stack $30_1$ to the stack $30_3$, the thicknesses $t_1L$ to $t_3L$ of the first optical material layers $31_iL$ are different from each other, and the thicknesses $t_1H$ to $t_3H$ of the second optical material layers $31_iH$ are different from each other. Namely, the following relation is established.

$$t_1L \neq t_2L \neq t_3L$$

$$t_2H \neq t_2H \neq t_3H$$

In the optical film 10, the stack $30_1$ is designed such that the optical film 10 has a reflectance spectrum matching the target reflectance spectrum 50.

One method for ensuring the desired optical performance of the optical film 10 is to establish the criteria for wavelength selectivity. The wavelength selectivity can be evaluated based on the difference $\Delta R$ between the maximum reflectance and the minimum reflectance. The value of $\Delta R$ determines a reflection proportion of light in a desired wavelength range. The minimum value of $\Delta R$ is selected as the criterion for wavelength selectivity because a plurality of maximum reflectances and minimum reflectances is present. Theoretically, the maximum value of $\Delta R$ is 100% and the minimum value thereof is 0%, and ideally, $\Delta R$ should be 100%. Actually, $\Delta R$ is 50% or more for the wavelength-selective reflective film to have performance for use. An object of design is to ensure $\Delta R$ of 50% or more. A preferable value of $\Delta R$ is 60% or more, and more preferably 70% or more.

Figure 3:
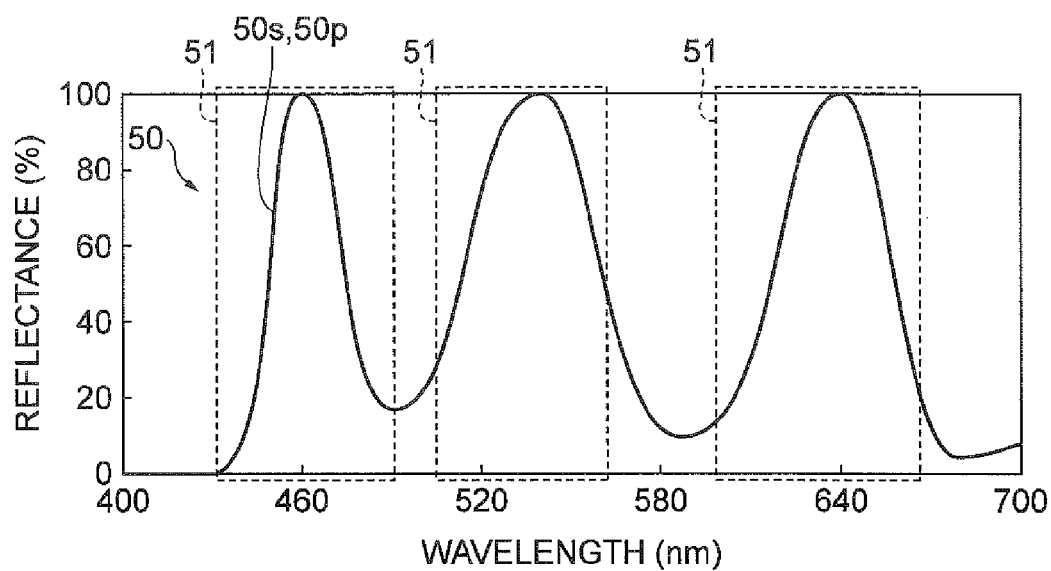
FIG. 3 is a diagram showing an example of a target reflectance spectrum for the optical film exemplified in FIG. 1.

The target reflectance spectrum 50 will be described. FIG. 3 is a diagram showing an example of the target reflectance spectrum for the optical film 10 shown in FIG. 1. In FIG. 3, the abscissa designates the wavelength (nm), and the ordinate designates the reflectance (%).

The target reflectance spectrum 50 has first and second reflectance spectrum components 50s and 50p corresponding to the s-polarized component (first polarized light) and the p-polarized component (second polarized light), respectively, in the wavelength range from 400 to 700 nm. The first and second reflectance spectrum components 50s and 50p each have at least one reflective peak region 51 that includes a spectrum region 51a having a reflectance of 50% or more and having a wavelength width of 20 to 60 nm. In other words, because the first and second reflectance spectrum components 50s and 50p each have at least one reflective peak region 51, the target reflectance spectrum 50 has at least one pair of reflective peak regions 51.

One example of the target reflectance spectrum 50 is a reflectance spectrum in which the first and second reflectance spectrum components 50s and 50p each have the reflective peak regions 51 in the blue wavelength range, the green wavelength range, and the red wavelength range, respectively, as shown in FIG. 3. The target reflectance spectrum 50 shown in FIG. 3 shows the case where of the target reflectance spectrum 50, the first reflectance spectrum component 50s matches the second reflectance spectrum component 50p. Unless otherwise specified, the embodiment in which the first reflectance spectrum component 50s matches the second reflectance spectrum component 50p will be described.

In the reflective peak region 51 according to one embodiment, the wavelength width of the spectrum region 51a can be set such that the wavelength for a reflection peak is located in the center between the minimum wavelength and the maximum wavelength of the spectrum region 51a.

The reflective peak region 51 is a region in which $\Delta R$ satisfies the range described above. The reflective peak region 51 can be preferably a region in which in the target reflectance spectrum 50, $\eta$ defined by the following expression has a reflectance $R_1$ of 50% or more as a maximum reflectance $R_{max}$.

$$\eta = 100 \times (R_1 - R_2)/(R_1 + R_2)$$

In the above expression that defines $\eta$, $R_1$ is the reflectance of one reflection peak $P_1$ of a plurality of reflection peaks (vertex portions of the peak portion) that the target reflectance spectrum 50 has. $R_2$ is a larger minimum reflectance of two minimum reflectances between reflection peaks before and after the reflection peak $P_1$ in a wavelength increasing or decreasing direction and the reflection peak $P_1$.

Figure 4:
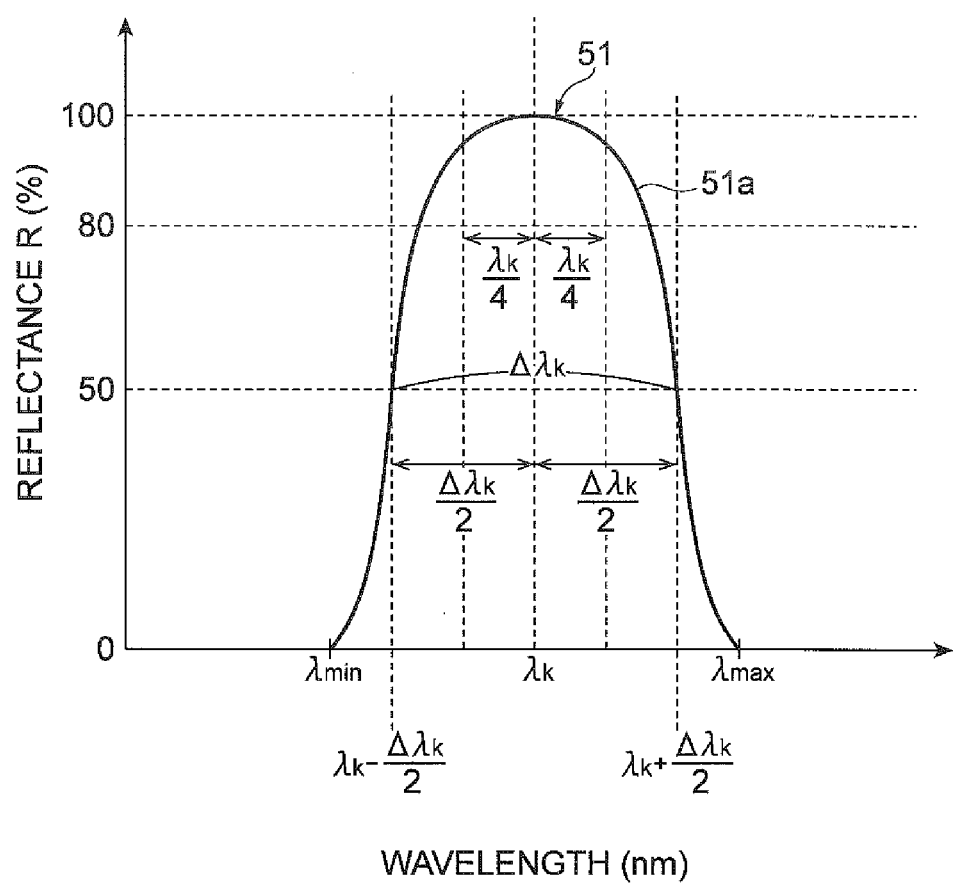
FIG. 4 is a diagram schematically showing an example of a reflective peak region in one wavelength range.

One example of the shape of the reflective peak region 51 will be specifically described. FIG. 4 is a diagram schematically showing one example of the reflective peak region 51 in one wavelength range. FIG. 4 is a schematic view for illustrating the shape of the reflective peak region 51. The minimum wavelength in the one wavelength range is defined as $\lambda_{min}$, and the maximum wavelength is defined as $\lambda_{max}$. In FIG. 4, an example is shown in which the reflectance R in $\lambda_{mm}$ is 0% and the reflectance R in $\lambda_{max}$ is 0%. For example, in the case where the one wavelength range is the blue wavelength range, the green wavelength range, and the red wavelength range, $\lambda_{min}$ is 430 nm, 510 nm, and 600 nm, respectively, for example, and $\lambda_{max}$ is 480 nm, 560 nm, and 660 nm, respectively, for example. The peak wavelength corresponding to the maximum reflectance $R_{max}$ ($R_{max}$=100% as one example in FIG. 4) in the reflective peak region 51 in the one wavelength range is referred to as $\lambda_k$.

In one embodiment, the shape of the reflective peak region 51 is a shape which satisfies Condition 1 below.

$$R \geq 50\% \text{ for } \{\lambda_k-(\Delta\lambda_k/2)\} \leq \lambda \leq \{\lambda_k+(\Delta\lambda_k/2)\} \quad \text{Condition 1:}$$

Preferably, the shape of the reflective peak region 51 is a shape which satisfies Condition 2 below.

$$R \geq 80\% \text{ for } \{\lambda_k-(\Delta\lambda_k/4)\} \leq \lambda \leq \{\lambda_k+(\Delta\lambda_k/4)\} \quad \text{Condition 2:}$$

In another embodiment, the shape of the reflective peak region 51 is a shape which satisfies Condition 3 below.

$$R \geq 80\% \text{ for } \{\lambda_k-(\Delta\lambda_k/2)\} \leq \lambda \leq \{\lambda_k+(\Delta\lambda_k/2)\} \quad \text{Condition 3:}$$

In Conditions 1 to 3, $\Delta\lambda_k$ is the wavelength width of the spectrum region 51a, and $\Delta\lambda_k$ is 20 nm to 60 nm. It is more preferable that $\Delta\lambda_k$ be 20 nm to 45 nm. FIG. 4 exemplifies the shape of the reflective peak region 51 in the case where Condition 1 is satisfied. In Condition 1, $\Delta\lambda_k$ corresponds to the half width (FWHM). Condition 3 shows that the reflectance of the spectrum region 51a is 80% or more.

In the case where the reflective peak region 51 has a peak shape having a sharper vertex portion, the wavelength selectivity of the reflected light from the optical film 10 can be improved. On the other hand, in the case where the shape of the reflective peak region 51 is a peak shape having a flatter vertex portion, in other words, a trapezoidal shape, the luminance of the reflected light in the optical film 10 can be improved.

One example of a method for producing the optical film according to one embodiment will be described. When the optical film is produced, first, the target reflectance spectrum is determined. The target reflectance spectrum may be properly determined according to the application of the optical film to be produced as long as the target reflectance spectrum is a spectrum including the first and second reflectance spectrum components 50s and 50p corresponding to the s-polarized component and p-polarized component in the wavelength range from 400 to 700 nm wherein the first and second reflectance spectrum components 50s and 50p each have at least one reflective peak region 51 that includes a spectrum region 51a having a reflectance of 50% or more and having a wavelength width of 20 to 60 nm. In the case where the produced optical film 10 is used for the liquid crystal display device, for example, the target reflectance spectrum 50 can have a shape of the spectrum corresponding to the properties of the light emission spectrum of the light source in the liquid crystal display device or a shape of the spectrum corresponding to the optical properties of the color filter layer that the liquid crystal panel has.

Here, as one example, the case where the optical film 10 corresponding to the target reflectance spectrum 50 exemplified in FIG. 3 is produced will be described. The target reflectance spectrum 50 can be a reflectance spectrum having the reflective peak region 51 in the wavelength range of three colors as described above.

Next, the number of the stacks and the configurations of the respective stacks are designed so as to attain the reflectance spectrum corresponding to the target reflectance spectrum 50. The target reflectance spectrum 50 has the reflective peak regions 51 in the blue wavelength range, the green wavelength range, and the red wavelength range, respectively, as exemplified in FIG. 3. For this reason, the optical film 10 to be produced has three stacks $30_1$ to $30_3$ as shown in FIG. 1.

Subsequently, the method for designing the difference $\Delta n_i$ in the refractive index between the first and second optical material layers $31_iL$ and $31_iH$ in the stack $30_i$, the thicknesses $t_iL$ and $t_iH$ of the first and second optical material layers $31_iL$ and $31_iH$, and the number of the basic blocks $31_i$ or the like will be described.

The difference $\Delta n_i$ in the refractive index between the two layers that form the basic block $31_i$ in the stack $30_i$ and the number of the basic blocks $31_i$ influence the shape of the target reflectance spectrum 50. Accordingly, the difference $\Delta n_i$ in the refractive index and the number of the basic blocks $31_i$ are designed such that the reflective peak regions 51 are shown in the blue wavelength range, the green wavelength range, and the red wavelength range for both of the s-polarized components and p-polarized components. In this design, usually the thicknesses $t_iL$ and $t_iH$ of the second optical material layers $31_iL$ and $31_iH$ are also determined.

The target reflectance spectrum 50 may have the reflective peak regions 51 in the wavelength ranges of three colors, respectively. The shapes of the reflective peak regions 51 in the wavelength ranges of three colors can be designed to have the desired optical properties of the optical film 10.

The method for designing the configuration of the stack $30_i$ according to the target reflectance spectrum 50 includes at least two methods. One is a method using a $\lambda/4$ method, and the other is a method using an optimization algorithm.

The $\lambda/4$ method is a method discussed in the literature (A) below. The method using an optimization algorithm can be used to more finely adjust the reflectance spectrum components corresponding to the s-polarized component and p-polarized component, respectively. The method using an optimization algorithm uses the characteristic matrix method described in the literature (A) and modified for the anisotropy material as described in the literature (B) below. The method using an optimization algorithm is shown in the literatures (C) and (D) below, for example.

(A) M. Born, and E. Wolf, Principles of Optics, 7th (expanded) ed., Cambridge University press, San Francisco (1999).
(B) M. F. Weber, C. A. Stover, L. R. Gilbert, T. J. Nevitt, A. J. Ouderkirk, "Giant birefringent optics in multilayer polymer mirrors", Science, vol. 287, pp. 2451.
(C) S. Banerjee and L. N. Hazra, Experiments with a genetic algorithm for structural design of cemented doublets with prespecified aberration targets, App. Opt., 40, no. 34, 6265 (2001).
(D) S. Banerjee and L. N. Hazra, "structural design of broken contact doublets with prespecified aberration targets using genetic algorithm", J. of Modern Optics Vol. 49, No. 7, 2002, pp. 1111.

The method for designing the configuration of the stack $30_i$ according to the target reflectance spectrum 50 will be described. In the design, of the incident light 40, a component polarized in the x-direction is the s-polarized component.

Furthermore, in the design, the refractive indices $n_1L$ to $n_3L$ of the first optical material layers $31_1L$ to $31_3L$ are constant (namely, the same) in all the stacks $30_1$ to $30_3$. Similarly, the refractive indices $n_1H_1$ to $n_3H$ of the second optical material layers $31_1H$ to $31_3H$ are constant (namely, the same) in all the stacks $30_1$ to $30_3$. Accordingly, the stacks $30_1$ to $30_3$ do not need to be treated separately with respect to the refractive index, and $n_iL$ can be expressed as nL and $n_iH$ can be expressed as nH. Furthermore, $\Delta n_i$ can be expressed as $\Delta n$ (=nH−nL).

The stacks $30_1$ to $30_3$ are designed so as to have the reflective peak regions 51 in the blue wavelength range, the green wavelength range, and the red wavelength range, respectively. Accordingly, the reflection peak wavelength $\lambda_k$ and the wavelength width $\Delta\lambda_k$ described in the description of FIG. 4 are also referred to a reflection peak wavelength $\lambda_i$ and wavelength width $\Delta\lambda_i$, respectively, corresponding to the stacks $30_1$ to $30_3$.

The method for designing the stacks $30_1$ to $30_3$ using the $\lambda/4$ method will be described. In the $\lambda/4$ method, the design is determined considering the difference $\Delta n$ in the refractive index between the first and second optical material layers $31_iL$ and $31_iH$.

Usually as $\Delta n$ increases, the reflectances at all the wavelengths increase and the proportion of the light having undesired wavelengths increases. According to this fact, the difference ($\Delta R$) between the maximum value and the minimum value of the reflectance can be reduced to less than 50%. On the other hand, as $\Delta n$ decreases, the reflectances at all the wavelengths reduce. As a result, the maximum value of the reflectance reduces to be much smaller than 100%. This phenomenon reduces the maximum value of the reflectance to a value at which $\Delta R$ cannot be employed. For this reason, if $\Delta n$ is excessively large or small, the wavelength dependency of the reflectance tends to disappear. In other words, if the wavelength dependency of the reflectance is desired, excessively large or small $\Delta n$ is also unnecessary. To realize the desired reflectance spectrum of the optical film 10, a preferable range for $\Delta n$ is present. As the range of the value $\Delta n$, the range of 0.05 to 0.25 described above is preferable.

In the design, the reflection peak wavelength $\lambda_i$ of the target reflectance spectrum 50 is determined. From the viewpoint of actual practicality, it may be determined as follows: $\lambda_1=460$ mm, $\lambda_2=540$ nm, $\lambda_3=640$ nm when the blue wavelength range, the green wavelength range, and the red wavelength range have the reflective peak regions 51, respectively.

Next, the thicknesses $t_iL$ and $t_iH$ are determined based on the following expressions.

$$t_iL=\lambda_i/(4(nL))$$

$$t_iH=\lambda_i/(4(nH))$$

Furthermore, the number of the basic blocks $31_i$ can be determined based on the maximum reflectance $R_{j,max}$ where the maximum reflectance in the reflection properties of the stack $30_i$ is defined as $R_{i,max}$. The number of the basic blocks $31_i$ may be the same or different in the stacks $30_1$ to the stack $30_3$. For example, the number of the basic blocks $31_i$ can be determined using the following expression.

[Expression 6]

$$R_{i,max} = \left[\frac{1-\left(\frac{nH}{nL}\right)^N}{1+\left(\frac{nH}{nL}\right)^N}\right]^2 \quad (6)$$

In the above expression representing $R_{i,max}$, N is the total sum of the number of the first and second optical material layers $31_iL$ and $31_iH$ that the stack $30_i$ has. Namely, $N=2M$. In this case, the number of the basic pairs $31_i$ is $N/2$. In the above expression representing as one example, it is assumed that the way of the incident light entering the stack $30_i$ is vertical incidence, and an optical medium on the side of the light entering the stack $30_i$ is the same as that on the side of the light being emitted from the stack $30_i$. The expression representing the maximum reflectance $R_{i,max}$ may be properly calculated according to the way of the incident light entering or a refractive index $n_0$ of its surrounding medium.

The second design method is a method using an optimization algorithm to determine the thicknesses $t_iL$ and $t_iH$ of the first and second optical material layers $31_iL$ and $31_iH$, the difference $\Delta n_i$ in the refractive index, and the number of layers of the first and second optical material layers $31_iL$ and $31_iH$ in the stacks $30_i$ (namely, the number of the basic blocks $31_i$).

An object of optimization is to match the properties of the reflectance of the optical film with the target reflectance spectrum. One example of the target reflectance spectrum is a light emission spectrum of a given LED (such as blue, green, and red). The target reflectance spectrum used for calculation in Examples described later is a light emission spectrum of a Lumi LED (trade name). The target light emission spectrum of the Lumi LED (trade name) shows the peaks of three wavelengths corresponding to the regions of blue (B), green (G), and red (R) in the visible light region. The peak positions are approximately $\lambda_1=462.5$ nm, $\lambda_2=532.5$ nm, and $\lambda_3=632.5$ nm. However, the light emission spectrum of another LED or the transmittance spectrum of a color filter layer can also be used similarly.

In the description of the optimization algorithm, the light emission spectrum of the Lumi LED (trade name) is the target reflectance spectrum. Because the light emission spectrum as the target reflectance spectrum includes the three peaks, an optical film having a multi-stack structure including exactly three stacks is designed. Namely, as shown in FIG. 1, the optical film 10 is designed so as to include the three stacks $30_1$ to $30_3$ in which the stacks $30_1$ to $30_3$ have the reflective peak regions 51 in the blue wavelength range, the green wavelength range, and the red wavelength range, respectively.

In the optimization algorithm, the number of the layers of the first and second optical material layers $31_iL$ and $31_iH$ can be determined based on the maximum reflectance $R_{i,max}$ in the reflection properties of the stack $30_i$. The number of the layers of the first and second optical material layers $31_iL$ and $31_iH$ in the stack $30_i$ can also be a parameter. However, from the viewpoint of reducing the number of parameters, it is preferable that the number of the layers of the first and second optical material layers $31_iL$ and $31_iH$, namely, the number of the basic blocks $31_i$ be constant. The number of the layers of the first and second optical material layers $31_iL$ and $31_iH$ in the stack $30_i$ is 50 or more and 200 or less, for example, and the number of the layers in the entire optical film 10 can be selected in the range of 150 or more and 500 or less.

In the optimization algorithm, a simulation is performed using the difference $\Delta n_i$ in the refractive index between the first and second optical material layers $31_iL$ and $31_iH$ in the stack $30_i$ and the thicknesses $t_iL$ and $t_iH$ as the parameters to optimize the respective parameters so as to match the reflective peak region 51 of the reflectance spectrum in the stack $30_i$ and the wavelength width $\Delta\lambda_i$. Even if the optimization algorithm is used, the difference $\Delta n_i$ in the refractive index is 0.05 or more and 0.25 or less (namely, $0.05 \leq \Delta n_i \leq 0.25$) as one example as described above.

In one embodiment, the optical film 10 may be designed assuming that the materials for the first optical material layers $31_1L$ to $31_3L$ are the same, and the materials for the second optical material layers $31_1H$ to $31_3H$ are the same. In this case, the number of the parameters can be further reduced.

In the case where the materials for the first optical material layers $31_iL$ to $31_3L$ are the same and the materials for the second optical material layers $31_1H$ to $31_3H$ are the same, the optimization algorithm can be implemented with eight design parameters. Namely, the parameters are the refractive indices of the two layers that form the basic pair and six (two thicknesses in each of the stacks) thicknesses in total. The parameters are expressed by nL, Δn, $t_1L$, $t_1H$, $t_2L$, $t_2H$, $t_3L$, and $t_3H$. nH is given by nH=nL+Δn.

Subsequently, the optical film 10 is produced under the design conditions for the optical film 10.

One example of the method for producing the optical film 10 will be described.

The materials for the first and second optical material layers $31_iL$ and $31_iH$ may be selected from the polymers and copolymers thereof exemplified above. The material for the first optical material layer $31_iL$ can be a material that produces no significant difference in the refractive indices in the x-, y-, and z-directions when the material is processed under necessary processing conditions. Namely, the material can be a material that enables the anisotropy of the first optical material layer $31_iL$ to fall with the range in which the expression (4a) is satisfied when the material is processed under the necessary processing conditions. Similarly, the material for the second optical material layer $31_iH$ can be a material that produces no significant difference in the refractive indices in the x-, y-, and z-directions when the material is processed under necessary processing conditions. Furthermore, the first and second optical material layers $31_iL$ and $31_iH$ preferably have the same rheological properties (such as melt viscosity) so as to be co-extruded.

The above-described processing conditions can be selected such that a desired refractive index relation between the first and second optical material layers $31_iL$ and $31_iH$ is attained. The desired refractive index relation can be achieved by various methods. Examples of the method for attaining the desired refractive index relation include stretching during or after formation of a multi-layer film structure to be the optical film 10 (for example, the case where the materials for the first and second optical material layers $31_iL$ and $31_iH$ are an organic material), multi-layer extrusion methods (or co-extrusion methods) (for example, the case where the materials for the first and second optical material layers $31_iL$ and $31_iH$ are liquid crystalline), and multi-layer coating techniques as described above. The multi-layer coating techniques are not particularly limited, and standard methods for the multi-layer coating technique can be used. Examples of the multi-layer coating techniques include wet process techniques such as a spin coating method and a die coating method, and dry process techniques such as chemical deposition and sputtering. From the viewpoint of easiness in production of the optical film 10, the multi-layer extrusion method is preferable. The optical film 10 may be produced by bonding the stacks separately produced.

For organic polymers that can be oriented by stretching, the multi-layer film to be the optical film 10 is prepared by co-extruding polymers that form the respective layers as formation of a typical multi-layer film. Subsequently, the multi-layer film is substantially stretched at a selected temperature in two directions orthogonal to each other (biaxial stretch) to orient the multi-layer film. Thereby, the optical film 10 is produced. A step of heat setting the multi-layer at the selected temperature may be provided after the multi-layer film is formed. The extrusion and stretching may be performed as one step. So as not to substantially reduce the length of the multi-layer film in the direction orthogonal to the stretch direction (orthogonal direction), the multi-layer film may be relaxed in the orthogonal direction. To attain the optical film 10 as the multi-layer film having desired optical properties, the temperature before the stretching process, the stretching temperature, the degree of stretch, the stretch ratio, the heat-setting temperature, the heat-setting time, relaxation of heat-setting, and stretch relaxation in the orthogonal direction can be selected. These variables are related to each other. For example, a relatively low degree of stretch can be used at a relatively low stretching temperature. Usually, the stretch ratio is in the range of preferably 1:2 to 1:10, and 1:3 to 1:7 is more preferable.

The layers that form the multi-layer film to be the optical film 10 include the layers as the spacer layer S and the skin layer 20. The multi-layer film has been described as the multi-layer structure to be the optical film 10, while the multi-layer structure as the stacks $30_1$ to $30_3$ may be used as the multi-layer film. As shown in FIG. 1, the spacer layer S and the skin layer 20 that the optical film 10 has are useful when the multi-layer extrusion method is used in production of the optical film 10. If the spacer layer S and the skin layer 20 are included, for example, mechanical properties can be improved in the step after formation of the multi-layer film structure (such as a stretching step).

It is ideal that the first and second optical material layers $31_iL$ and $31_1H$ are isotropic. In the case where anisotropy is produced during the production process or the like, $Δn_iL$ and $Δn_iH$ are preferably 0.02 or less, and more preferably 0.01 or less.

As described above, the optical film 10 is produced based on the values designed such that the optical film has the reflectance spectrum matching the target reflectance spectrum 50. As a result, the optical film 10 reflects both the s-polarized component and the p-polarized component so as to have a predetermined reflectance spectrum to the incident light 40. Namely, the optical film 10 is a wavelength-selective reflective film having wavelength selectivity without having a polarization and separation function. The optical film 10 as the wavelength-selective reflective film can be used for the liquid crystal display device to improve the saturation. This respect will be described with reference to FIG. 5.

Figure 5:
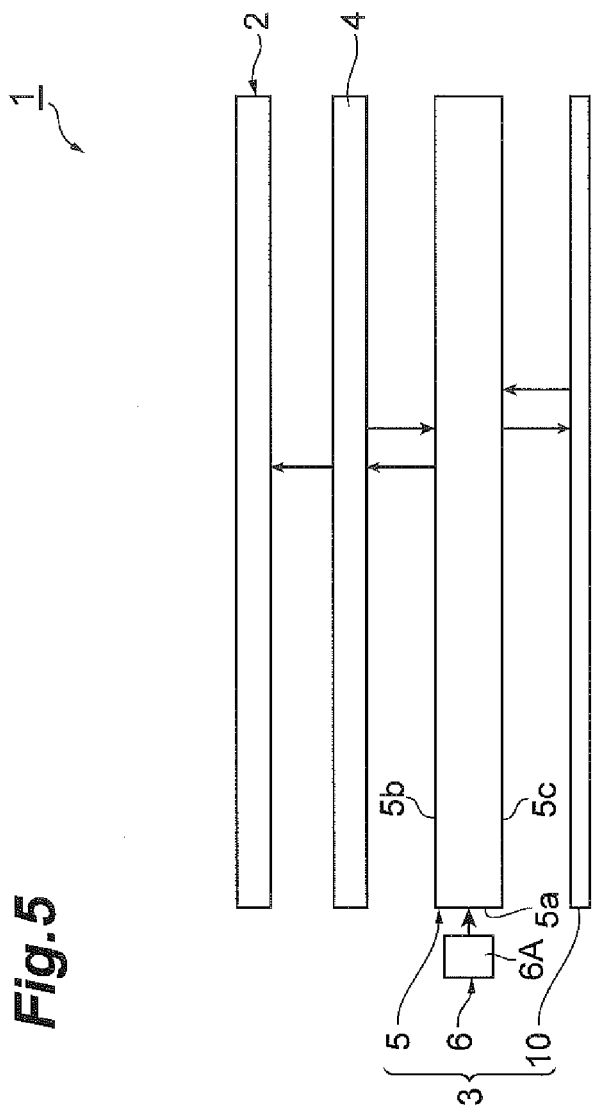
FIG. 5 is a diagram showing a schematic configuration of a liquid crystal display device to which the optical film shown in FIG. 1 is applied.

FIG. 5 is a diagram showing the schematic configuration of the liquid crystal display device to which the optical film shown in FIG. 1 is applied. FIG. 5 shows the exploded cross sectional configuration of the liquid crystal display device 1.

The liquid crystal display device 1 includes a liquid crystal display panel (hereinafter simply referred to as a liquid crystal panel) 2, a surface light source device 3, and a polarizing plate 4 disposed between the liquid crystal panel 2 and the surface light source device 3. In FIG. 5, light beams are schematically shown with arrows.

The liquid crystal panel 2 is illuminated by the light emitted from the surface light source device 3 to display an image. The liquid crystal panel 2 mainly includes polarizing plates on both side of the liquid crystal layer and a color filter layer. The configuration of the components above that the liquid crystal panel 2 includes can be a known configuration. The liquid crystal panel 2 has an orientation film, an electrode and the like other than the components exemplified above. Namely, the liquid crystal panel 2 may have a known configuration.

The polarizing plate 4 transmits predetermined polarized light and reflects the polarized light orthogonal to the predetermined polarized light. Hereinafter, the polarizing plate 4 transmits the light having the p-polarized component as the predetermined polarized light and reflects the light having the s-polarized component.

The surface light source device 3 is disposed on the rear surface side of the liquid crystal panel 2 in FIG. 5, and emits the planar light toward the liquid crystal panel 2. The surface light source device 3 is an edge light type surface light source device including a light-guiding plate (surface light-emitting element) 5, a light source unit 6 disposed in the vicinity of a side surface 5a of the light-guiding plate 5, and the optical film 10.

The light-guiding plate 5 propagates the light entering from the side surface 5a within the light-guiding plate 5 while the light is totally reflected between a light-emitting surface portion 5b crossing the side surface 5a (intersecting in FIG. 5) and a reflecting surface portion 5c located on the side opposite to the light-emitting surface portion 5b. In the reflecting surface portion 5c, a non-total reflecting region which reflects light under conditions different from the total reflecting condition is properly provided. The non-total reflecting region can be a region including diffusion dots such as printed dots, and a lens portion extending in one direction or a domed lens portion, etc. The light reflected by the non-total reflecting region goes to an outside from the light-emitting surface portion 5b without totally reflecting on the light-emitting surface portion 5b. Accordingly, in the above configuration, part of the light beams propagating while totally reflecting within the light-guiding plate 5 is extracted from the light-emitting surface portion 5b. As a result, the planar light is emitted from the light-guiding plate 5. Usually, the non-total reflecting region is provided in a pattern so as to provide uniform luminance of the planar light in the plane.

The light source unit 6 has a light source 6A disposed facing the side surface 5a which is a light entering surface of the light-guiding plate 5. Examples of the light source 6A include a positional light source. Examples of the positional light source include light emission diodes, halogen lamps, and tungsten lamps. Examples of the light emission diodes include RGB type light emission diodes emitting red light, green light, and blue light, and white type light emission diodes composed of a combination of a blue light emission diode with a yellow fluorescent body or a combination of a blue light emission diode with green and red fluorescent bodies.

In the case where the light source 6A is the positional light source, the light source unit 6 includes a plurality of light sources 6A. In this case, the plurality of light sources 6A is disposed linearly on the side surface 5a in the direction orthogonal to the thickness direction of the light-guiding plate 5. The light source 6A is not limited to the positional light source, and may be a linear light source such as a fluorescent tube.

In the surface light source device 3 shown in FIG. 5, of four side surfaces of the light-guiding plate, the light source unit 6 is disposed facing only one side surface 5a. However, the configuration will not be limited to this. For example, the light source unit 6 may be disposed facing at least one side surface of the light-guiding plate 5.

The optical film 10 is a wavelength-selective reflective film designed and produced based on the target reflectance spectrum 50 shown in FIG. 3.

In the above configuration, the planar light emitted from the light-emitting surface portion 5b of the light-guiding plate 5 enters the polarizing plate 4 as the incident light 40. The light having the p-polarized component transmits through the polarizing plate 4, and the light having the s-polarized component is reflected to return to the side of the light-guiding plate 5.

At least part of the light having the s-polarized component returned to the side of the light-guiding plate 5 transmits through the light-guiding plate 5 to enter the optical film 10. The polarization of the light having the s-polarized component is disturbed until the light is reflected by the polarizing plate 4 and enters the optical film 10. Such disturbance may be attained, for example, by adding a diffusing agent to the light-guiding plate 5 in the range in which the function of the light-guiding plate 5 is not deviated. Alternatively, for example, a film for disturbing polarization (such as a diffusion film) may be disposed between the polarizing plate 4 and the optical film 10.

The optical film 10 reflects the light beams in the predetermined wavelength range. As a result, of the light beams returned from the polarizing plate 4, the light beams in the predetermined wavelength range are reflected by the optical film 10. The light beams in the predetermined wavelength range reflected by the optical film 10 enter the polarizing plate 4 again. Namely, the light beams reflected by the polarizing plate 4 are recycled.

Accordingly, the light emitted from the polarizing plate 4 includes the light beams directly emitted from the light-guiding plate 5 and the recycled light beams. The recycled light beams are the light beams in the predetermined wavelength range, and therefore the light beams emitted from the polarizing plate 4 also include many light components in the predetermined wavelength range.

The light beams emitted from the polarizing plate 4 transmit through the liquid crystal panel 2 before the light beams finally depart from the liquid crystal display device 1 and reach a viewer. The liquid crystal panel 2 has a color filter layer as described above. The color filter layer is composed of at least three filters, namely, blue, green, and red filters that can transmit the light beams having blue, green, and red components of visible light, respectively. For this reason, the wavelength spectrum of the light emitted from the liquid crystal panel 2 receives influences of the characteristics of light transmittance of the color filter layer.

If the conventional reflective film with the wide band (broad band) is disposed on the rear surface side of the light-guiding plate 5, the wavelength spectrum of the light that reaches the viewer is totally determined by the characteristics of light transmittance of the color filter layer.

In contrast, if the optical film 10 is used on the rear surface side of the light-guiding plate 5 (as shown in FIG. 5) instead of the conventional reflective film, the wavelength spectrum of the light that reaches the viewer is determined by the characteristics of light transmittance of the color filter layer and the characteristics of light reflection of the wavelength selectivity of the optical film 10.

The optical film 10 reflects the light beams in the blue, green, and red wavelength ranges, and does not reflect the light beams at undesired wavelengths; for this reason, the saturation of the light emitted from the liquid crystal display device 1 can be improved.

Figure 6:
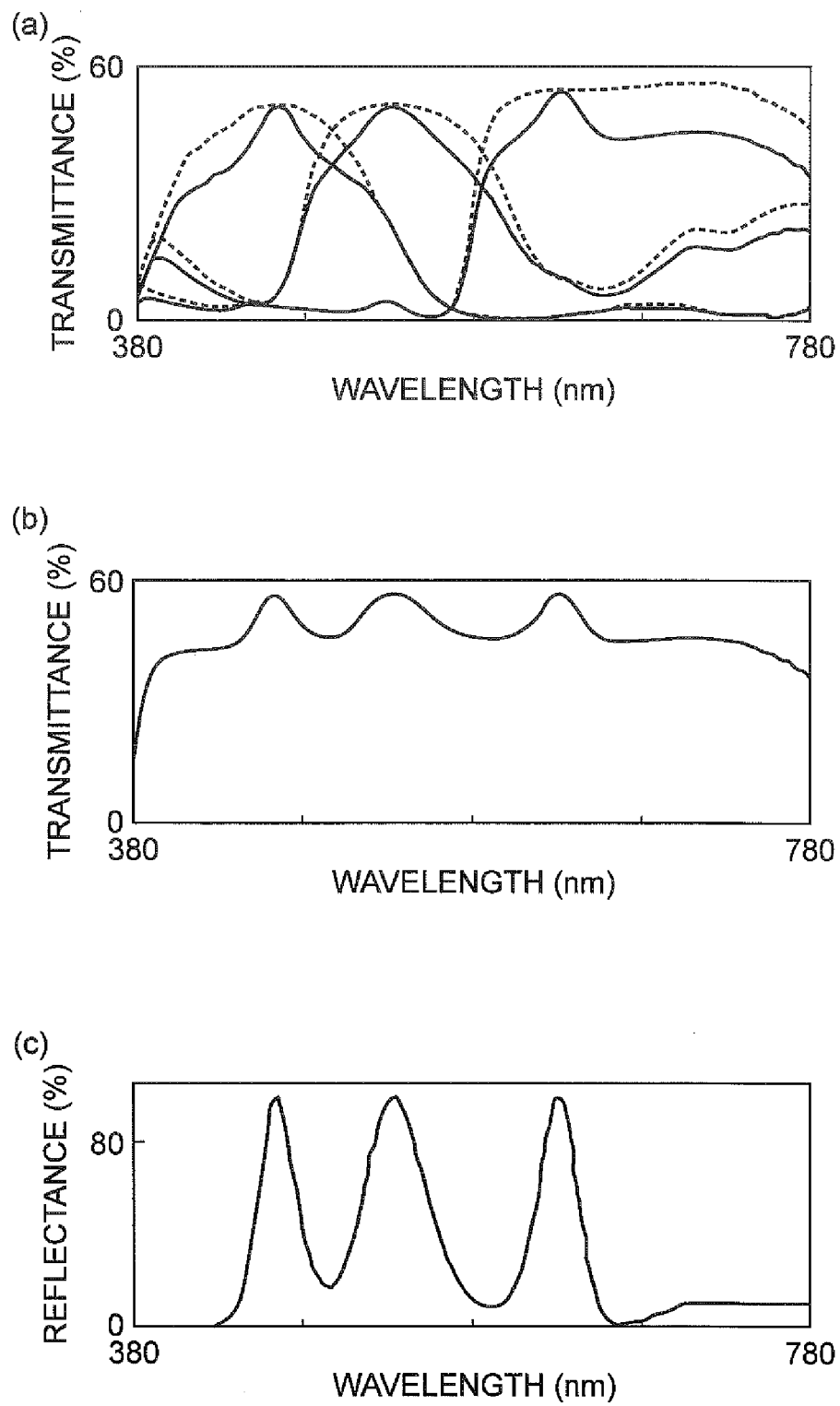
FIG. 6(a) is a diagram showing the results of calculation of the wavelength spectrum of light emitted from a liquid crystal panel in a model of the liquid crystal display device shown in FIG. 5.
FIG. 6(b) is a diagram showing the results of calculation of the wavelength spectrum of light emitted from a polarizing plate in the model of the liquid crystal display device shown in FIG. 5.
FIG. 6(c) is a diagram showing the wavelength spectrum of light reflected by the optical film in the model of the liquid crystal display device shown in FIG. 5.

FIG. 6(*a*) is a diagram showing the results of calculation of the wavelength spectrum of the light emitted from the liquid crystal panel in a model of the liquid crystal display device shown in FIG. 5. In FIG. 6(*a*), the abscissa designates the wavelength (nm), and the ordinate designates the transmittance (%). FIG. 6(*b*) is a diagram showing the results of calculation of the wavelength spectrum of the light emitted from the polarizing plate in the model of the liquid crystal display device shown in FIG. 5. In FIG. 6(b), the abscissa designates the wavelength (nm), and the ordinate designates the transmittance (%). FIG. 6(c) is a diagram showing the wavelength spectrum of the light reflected by the optical film in the model of the liquid crystal display device shown in FIG. 5. In FIG. 6(c), the abscissa designates the wavelength (nm), and the ordinate designates the reflectance (%).

As described above, the light emitted directly from the light-guiding plate 5 and the recycled light from the optical film 10 enter the polarizing plate 4. For this reason, the light emitted from the polarizing plate 4 includes the recycled light. Accordingly, FIG. 6(b) corresponds to the wavelength spectrum of the emitted light when the light having the wavelength spectrum shown in FIG. 6(c) as the recycled light enters the polarizing plate 4. FIG. 6(a) corresponds to the wavelength spectrum of the emitted light when the emitted light having the wavelength spectrum shown in FIG. 6(b) enters the liquid crystal panel 2 and is emitted from the liquid crystal panel 2. In the calculations shown in FIG. 6(a) to FIG. 6(c), it is assumed that 12.5% of the light emitted from the polarizing plate 4 is the recycled light. Referring to the actual tests, the recycled light of the light emitted from the polarizing plate 4 tends to be a great value, 20%.

The dashed lines in FIG. 6(a) designate the wavelength spectrums of the light beams emitted from the liquid crystal panel when the conventional reflective films in a broad range are used instead of the optical film 10. The conditions for attaining the spectrums expressed by the dashed lines are the same as the conditions for calculating the wavelength spectrum expressed by the solid line except that the reflection properties of the conventional reflective films in a broad band are used instead of the conditions on the reflection properties of the optical film 10. In FIG. 6(a) to FIG. 6(c), the abscissa designates the wavelength (nm). In FIG. 6(a) and FIG. 6(b), the ordinate designates the transmittance (%). In FIG. 6(c), the ordinate designates the reflectance (%).

From the comparison of the two wavelength spectrums shown in FIG. 6(a), it turns out that the optical film 10 is effective for removal of light at undesired wavelengths and an improvement in the degree of color saturation (saturation) as the entire display device. For this reason, from the viewpoint of an improvement in saturation, the optical film 10 is apparently more desired than the conventional reflective film. An improvement in saturation depends on the amount of the recycled light. When the optical film 10 is used, the saturation of the liquid crystal display device 1 increases with an increase in the proportion of the recycled light.

FIG. 5 shows only the optical components most related to describe the action effect of the optical film 10. The effect of increasing the saturation produced by the optical film 10 according to one embodiment is not limited to the model of the liquid crystal display device 1 shown in FIG. 5 as described above. The actual liquid crystal display device 1 includes additional components such as a diffusion plate and a λ/4 plate. Similarly, in the actual liquid crystal panel 2, many other components such as a polarizing plate and a compensation plate are incorporated. However, even if one or more of these components are added to the model of the liquid crystal display device 1 shown in FIG. 5, the increase in the saturation produced by the optical film 10 according to one embodiment is kept.

In the stack $30_i$, since the thicknesses $31_iL$ and $31_iH$ of the first and second optical material layers $31_1L$ and $31_iH$ are constant, the production of the optical film 10 is easy. Furthermore, since the total of the number of the first optical material layer $31_iL$ and the number of the second optical material layer $31_iH$ in the stack $30_i$ is 50 or more and 500 or less, the optical film 10 can more easily be produced and may be produced at low cost.

EXAMPLES

Hereinafter, using Examples, the present invention will be more specifically described, but the present invention will not be limited to Examples below. A variety of calculations for designing the optical film in Examples was performed by writing and executing computer programs using Fortran 90 and Mathcad (versions 11 and 15). In the description of Examples, same reference numerals will be given to components corresponding to those described in Embodiments.

The followings were assumed in design.

(1) In the design model of the optical film 10, the configuration shown in FIG. 1 and the x-direction, y-direction, and z-direction shown in FIG. 1 were used. In the design model, the optical film does not include one of the two skin layers 20 shown in FIG. 1.

(2) The optical film 10 includes three stacks $30_1$, $30_2$, and $30_3$, a spacer layer S that separates the stacks $30_1$ to $30_3$ from each other, and the skin layer 20 as the substrate.

(3) The first optical material layer $31_1L$ to the first optical material layer $31_3L$ of the stack $30_1$ to the stack $30_3$ are composed of the same polymer. Similarly, the second optical material layer $31_1H$ to the second optical material layer $31_3H$ of the stack $30_1$ to the stack $30_3$ are composed of the same polymer. Accordingly, in the refractive index, the refractive indices of the first optical material layer $31_1L$ to the first optical material layer $31_3L$ do not need to be distinguished, and the refractive indices of the second optical material layer $31_1H$ to the second optical material layer $31_3H$ do not need to be distinguished. For this reason, hereinafter, reference numerals 1, 2, and 3 distinguishing the stack $30_1$, the stack $30_2$, and the stack $30_3$ will be omitted in the expression of the refractive index.

(4) The first and second optical material layers $31_iL$ and $31_iH$ (i is any number of 1, 2, and 3) are an isotropic optical material layer.

(5) It was assumed that the form of incidence of the light to the stack $30_i$ is vertical incidence.

Example 1

In Example 1, an optical film 10 was designed using the λ/4 method for the predetermined target reflectance spectrum 50. It was assumed that the predetermined target reflectance spectrum 50 was a spectrum having a blue wavelength region, a green wavelength region, and a red wavelength region as predetermined wavelength regions. In the target reflectance spectrum 50, λ1=460 nm, $\lambda_2$=540 nm, and $\lambda_3$=640 nm.

The optical film 10 in Example 1 has three stacks $30_1$, $30_2$, and $30_3$ disposed on the skin layer 20 as a substrate having a refractive index of 1.5. Each stack $30_i$ is composed of 25 pairs of laminated isotropic optical material layers (first optical material layers $31_iL$) and isotropic optical material layers (second optical material layers $31_iH$). The value of nL and the value of nH are specifically 1.65 and 1.45, respectively, in all the stacks $30_1$, $30_2$, and $30_3$, for example. Namely, Δn is 0.02. The thicknesses of the two layers that form the basic pair of the stack, which were calculated by the λ/4 method, are as follows. At $\lambda_1$=460 nm, $t_1L$=79 nm, and $t_1H$=70 nm; at $\lambda_2$=540 nm, $t_2L$=93 nm and $t_2H$=82 nm; at $\lambda_3$=640 nm, $t_3L$=110 nm and $t_3H$=97 nm. Adjacent stacks $30_1$ are separated from each other by the spacer layer S as an optical material layer having a refractive index of 1.5 and a thickness of 180 nm. The reflectance spectrum was calculated for the light of a p-mode (p-polarized component) and the light of an s-mode (s-polarized component) which are orthogonal incident light beams whose polarization directions are orthogonal to each other. For the reflectance spectrum for the optical film 10, wavelengths at 60 points in the wavelength range from 400 nm to 700 nm at an interval of 5 nm were calculated. The medium on the side of the incident light entering the optical film 10 was air having a refractive index $n_0$=1.0.

Figure 7:
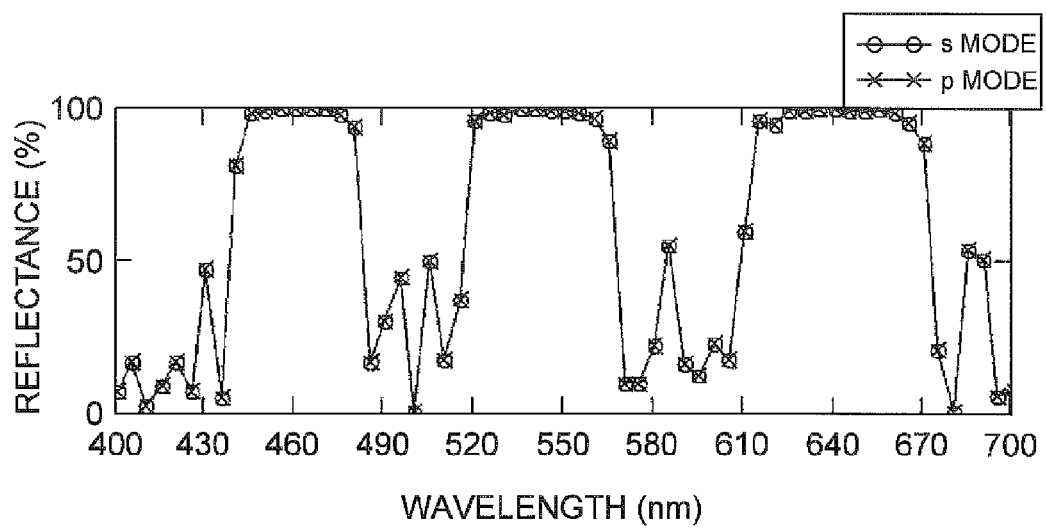
FIG. 7 is a diagram showing changes in the reflectance of the optical film designed in Example 1 according to the wavelength (spectrum).

Changes in the reflectance (spectrum) of the optical film 10 composed of a total of 152 (including the two spacer layers S) optical material layers according to the wavelength calculated using the λ/4 method are shown in FIG. 7. In FIG. 7, the abscissa designates the wavelength (nm), and the ordinate designates the reflectance (%). The reflectance spectrum shows the peaks of reflectance at $\lambda_1$=460 nm, $\lambda_2$=540 nm, and $\lambda_3$=640 nm in the target reflectance spectrum 50.

Example 2

Figure 8:
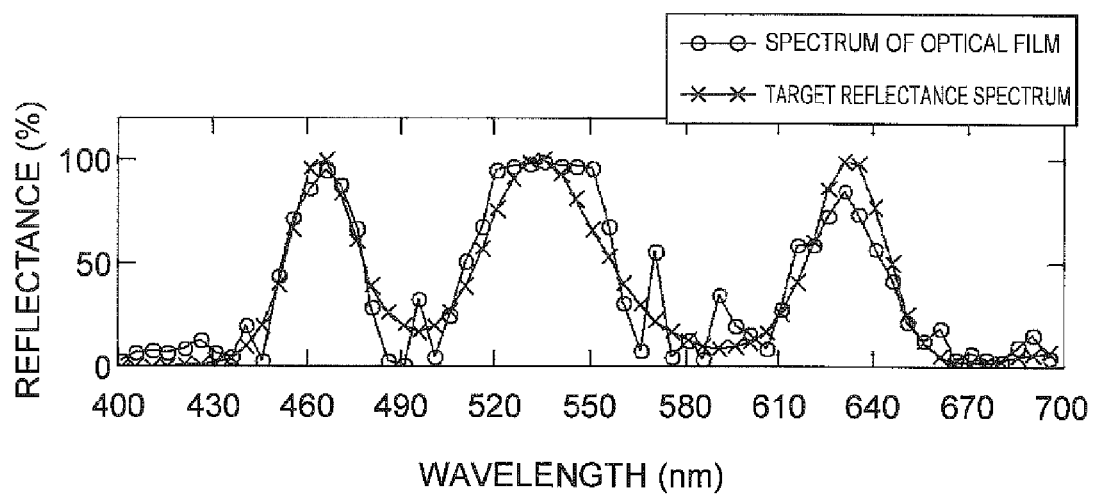
FIG. 8 is a diagram showing changes in the reflectance of the optical film designed in Example 2 according to the wavelength (spectrum).

An optical film 10 was designed for the predetermined target reflectance spectrum 50 using the optimization algorithm. As the predetermined target reflectance spectrum 50, the light emission spectrum of an Lumi LED (trade name) was used. The light emission spectrum of the Lumi LED (trade name) shows the peaks of three wavelengths corresponding to the blue (B), green (G), and red (R) regions in the visible light region. The peak positions are approximately $\lambda_1$=462.5 nm, $\lambda_2$=532.5 nm, and $\lambda_3$=632.5 nm. FIG. 8 shows the wavelength-dependent spectrum of the reflectance of the optical film having the structure designed using the optimization algorithm. In FIG. 8, the ordinate and the abscissa are the same as the diagram. In FIG. 8, the light emission spectrum of the Lumi LED (trade name) is also shown.

The values of the optimized design parameters were as follows. nL=1.48, the difference in the refractive index Δn=0.175, $t_1L$=28 nm, $t_1H$=181 nm, $t_2L$=61 nm, $t_2H$=111 nm, $t_3L$=111 nm, and $t_3H$=32 nm. In design, the number of the optical material layers in the three stacks $30_1$, $30_2$, and $30_3$ (sum of the number of the first optical material layers and the number of the second optical material layers) was 50. The refractive index of the skin layer 20 as the substrate and that of the spacer layer S were 1.5 similarly to the case of Example 1.

The optical properties of the optimized multi-layer structure shown in FIG. 8 are clearer than those (FIG. 7) of the multi-layer structure designed using the principles of λ/4. Accordingly, the optimization procedure is a more preferable method for designing the wavelength-selective reflective film having reflection properties matching the target spectrum. Furthermore, FIG. 8 shows that the optimization procedure is very effective for designing the multi-layer structure having reflection properties matching the given target spectrum.

Comparing FIG. 7 with FIG. 8, it turns out that the half widths around the three maximum values of the reflectances are relatively larger in the reflectance spectrum shown in FIG. 7. This effect is derived from Δn of 0.2 in the former, which is larger than the value of Δn of 0.175 in the latter. For this reason, from comparison of FIG. 7 with FIG. 8, it reveals that the half width increases with an increase in the value of Δn.

In these Examples, calculation was performed where the differences in the refractive index ΔnL and ΔnH were 0 in the respective layers that form the basic pair. However, the material that forms the optical film 10 is not limited to the optically isotropic materials. To produce the optical film 10 as the wavelength-selective reflective film, a polymer material exhibiting the anisotropy of the refractive index can also be used as described above.

In the description above, description has been made mainly using the combination of the layer having a high refractive index (average refractive index) and the layer having a low refractive index as the basic pair. Namely, the case where the total number of the layers is even has been described. Apparently from the principle of exhibiting the effect, the same effect is attained even if another optical layer is added to make the total number of the layers odd, for example. To prevent scratches and pollution of the surface of the optical film, a protective film may be provided. Furthermore, to prevent disorder of an interface produced in processing by extrusion molding, for example, an additional layer (skin layer) can be provided on one surface or both surfaces of the optical stack, exhibiting high optical properties.

As above, various Embodiments and Examples in the present invention have been described. However, the present invention will not be limited to the various Embodiments and Examples described above, and various modifications can be made without departing from the gist of the present invention. For example, in the examples in Embodiments above, the target reflectance spectrum 50 has the reflective peak regions 51 in the blue wavelength range, the green wavelength range, and the red wavelength range as one example of the target reflectance spectrum.

However, as described above, the target reflectance spectrum 50 may be a spectrum including the first and second reflectance spectrum components corresponding to the first polarized light polarized in a specific direction in a wavelength range from 400 to 700 nm and the second polarized light polarized in the direction orthogonal to the polarization direction of the first polarized light, respectively, wherein the first and second reflectance spectrum components each have at least one reflective peak region including a spectrum region having a reflectance of 50% or more and a wavelength width of 20 to 60 nm. If a reflectance spectrum matching such a target reflectance spectrum can be attained, the relation of the refractive index within the first and second optical material layers and that between these two layers are not limited to the numeric value exemplified above.

The target reflectance spectrum in which the first reflectance spectrum component for the s-polarized component matches the second reflectance spectrum component for the p-polarized component has been exemplified as the target reflectance spectrum 50. If the first and second reflectance spectrum components each have at least one pair of the reflective peak regions including the spectrum region having a reflectance of 50% or more and a wavelength width of 20 to 60 nm, the first and second reflectance spectrum components may be different.

The number of the stacks included in the optical film may be the number of the reflective peak regions in the target reflectance spectrum or more, specifically, may be the number (or the number of pairs) of the reflective peak regions in the first and second reflectance spectrum components or more. Accordingly, if the number of the reflective peak regions is one, the number of the stacks is one or more. If the number of the stacks is equal to or more than the number of the reflective peak regions, at least one stack is assigned to each reflective peak region; for this reason, the reflectance spectrum of the optical film is readily matched with the target reflectance spectrum. In the case where the number of the stacks is greater than the number of the reflective peak regions, for example, the reflectance spectrum corresponding to any of the wavelength peak regions may be attained with two stacks.

The polarizing plate 4 of the liquid crystal display device 1 shown in FIG. 6 has the function to reflect the s-polarized component, for example, but may not have such a function. Alternatively, the liquid crystal display device 1 may not include the polarizing plate 4. In these cases, the optical film 10 reflects the light leaked from the light-guiding plate 5 to the optical film 10 side, for example, to return the light to the light-guiding plate 5 side; for this reason, the function to increase saturation can be attained. Furthermore, in the embodiment shown in FIG. 6, the light-guiding plate has been exemplified as the surface light-emitting element. However, the surface light-emitting element may be the so-called diffusion plate. In this case, the surface light source device or liquid crystal display device is of a type in which the light source unit is disposed on the rear surface side of the diffusion plate immediately below the diffusion plate.

In the case where the first and second optical material layers $31_iL$ and $31_iH$ are substantially isotropic or have anisotropy (birefringence properties) and the birefringence is 0.02 or less, the refractive indices nL and nH as the respective average refractive indices of the first and second optical material layers $31_iL$ and $31_iH$ may be defined by the following expressions.

$$nL=(nLx+nLy+nLz)/3$$

$$nH=(nHx+nHy+nHz)/3$$

REFERENCE SIGNS LIST

1 . . . liquid crystal display device, 2 . . . liquid crystal panel, 3 . . . surface light source device, 5 . . . light-guiding plate (surface light-emitting element), 5b . . . light-emitting surface portion, 6 . . . light source unit, 10 . . . optical film, $30_i$ (i is any number of 1, 2, and 3) . . . stack, $31_i$ (i is any number of 1, 2, and 3) . . . basic block (first and second layers basic pair), $31_i a$ (i is any number of 1, 2, and 3) . . . first optical material layer (first layer), $31_i H$ (i is any number of 1, 2, and 3) . . . second optical material layer (second layer), $31a$ . . . optical material layer, 50 . . . target reflectance spectrum, 50s . . . first reflectance spectrum component, 50p . . . second reflectance spectrum component, 51 . . . reflective peak region, 51a . . . spectrum region.

The invention claimed is:

1. An optical film, comprising at least one stack having a plurality of basic pairs, each pair being composed of a first layer and a second layer having different refractive indices from each other and being laminated,
   wherein the number of the stacks, a difference in the refractive index between the first and second layers in the at least one stack, and the number of the basic pairs are set such that a reflectance spectrum of the at least one stack as a whole matches a target reflectance spectrum,
   the target reflectance spectrum includes first and second reflectance spectrum components corresponding to first polarized light polarized in a specific direction in a wavelength range from 400 to 700 nm and second polarized light polarized in a direction orthogonal to the polarizing direction of the first polarized light, respectively, wherein each of the first and second reflectance spectrum components is a spectrum having at least one reflective peak region including a spectrum region having a reflectance of 50% or more and a wavelength width of 20 to 60 nm,
   wherein refractive indices $n_iLx$, $n_iLy$, $n_iLz$ of the first layer in a thickness direction and two directions orthogonal to the thickness direction are substantially equal to one another, and
   wherein refractive indices niHx, niHy, niHz of the second layer in a thickness direction and two directions orthogonal to the thickness direction are substantially equal to one another.

2. The optical film according to claim 1, wherein ΔnL and ΔnH have a relation defined by an expression (1) where a difference in the refractive index within the first layer is defined as ΔnL and a difference in the refractive index within the second layer is defined as ΔnH:

[Expression 1]

$$\Delta nL \leq 0.02 \text{ and } \Delta nH \leq 0.02 \quad (1)$$

wherein $\Delta nL = nL_{max} - nL_{min}$; $\Delta nH = nH_{max} - nH_{max}$; $nL_{max}$ and $aH_{max}$ are maximum refractive indices of the first and second layers, respectively, of the refractive indices of the first and second layers; $nL_{min}$ and $nH_{min}$ are minimum refractive indices of the first and second layers, respectively, of the refractive indices of the first and second layers.

3. The optical film according to claim 1, wherein Δn satisfies an expression (2) where the refractive index of the first layer is defined as nL, the refractive index of the second layer is defined as nH, and the difference in the refractive index is defined as Δn:

[Expression 2]

$$0.05 \leq \Delta n \leq 0.25 \quad (2)$$

wherein
   $\Delta n = |nH - nL|$;
   $nL = (nL_{max} + nL_{min})/2$;
   $nH = (nH_{max} + nH_{min})/2$;
   $nL_{max}$ and $nH_{max}$ are the maximum refractive indices of the first and second layers, respectively, of the refractive indices of the first and second layers; and $nL_{min}$ and $nH_{min}$ are minimum refractive indices of the first and second layers, respectively, of the refractive indices of the first and second layers.

4. The optical film according to claim 1, wherein the number of the basic pairs is 25 to 50.

5. The optical film according to claim 1, wherein thicknesses of the first layer and the second layer each are 5 to 400 nm.

6. The optical film according to claim, wherein the number of the stacks is the number of the reflective peak regions or more.

7. The optical film according to claim 1, wherein the number of the stacks is 1 to 3.

8. The optical film according to claim 1, wherein a reflectance spectrum component of the first polarized light and that of the second polarized light in the target reflectance spectrum each have one reflective peak region in the range of 430 to 480 nm, one reflective peak region in the range of 510 to 560 nm, and one reflective peak region in the range of 600 to 660 nm.

9. A surface light source device, comprising:
a light source unit,
a surface light-emitting element that converts light from the light source unit into planar light to emit the planar light from a light-emitting surface portion, and
the optical film according to claim 1, disposed for the surface light-emitting element on a side thereof opposite to the light-emitting surface portion.

10. A liquid crystal display device, comprising;
a light source unit,
a surface light-emitting element that converts light from the light source unit into planar light to emit the planar light from a light-emitting surface portion,
the optical film according to claim 1, disposed for the surface light-emitting element on a side thereof opposite to the light-emitting surface portion, and a liquid crystal panel disposed on the light-emitting surface portion of the surface light-emitting element, the planar light entering the liquid crystal panel.

* * * * *